United States Patent [19]
Fowler

[11] 3,924,258
[45] Dec. 2, 1975

[54] DIGITAL DEPTH SOUNDER
[75] Inventor: John T. Fowler, Winthrop, Mass.
[73] Assignee: Arthur D. Little, Inc., Cambridge, Mass.
[22] Filed: Mar. 21, 1974
[21] Appl. No.: 453,553

[52] U.S. Cl. .................................. 340/3 R; 340/1 C
[51] Int. Cl.² ........................................... G01S 9/68
[58] Field of Search ...................... 340/1 C, 3 C, 3 R

[56] References Cited
UNITED STATES PATENTS

| | | | |
|---|---|---|---|
| 3,038,142 | 6/1962 | Wippert | 340/3 R |
| 3,267,413 | 8/1966 | Beebe et al. | 340/3 R |
| 3,344,421 | 9/1967 | Dildy, Jr. | 340/3 R |
| 3,539,978 | 11/1970 | Stedtnitz | 340/3 R |
| 3,739,325 | 6/1973 | Ludwig | 340/3 R |

OTHER PUBLICATIONS
Cooke, *The Radio and Electronic Engineer*, June 1967, pp. 353-360.

Primary Examiner—Richard A. Farley
Attorney, Agent, or Firm—Weingarten, Maxham & Schurgin

[57] ABSTRACT

A depth sounder in which a sonic transducer and associated analog circuitry are contained within a common housing and provide serial pulses which are digitally processed for discriminating bottom echoes from spurious echoes. Spurious echo pulses from intermediate objects in the transmission path as well as spurious echo pulses harmonically related to any other echo pulse are discriminated against such that only the last received echo, other than a harmonic, during a sounding interval is displayed to indicate depth.

10 Claims, 10 Drawing Figures

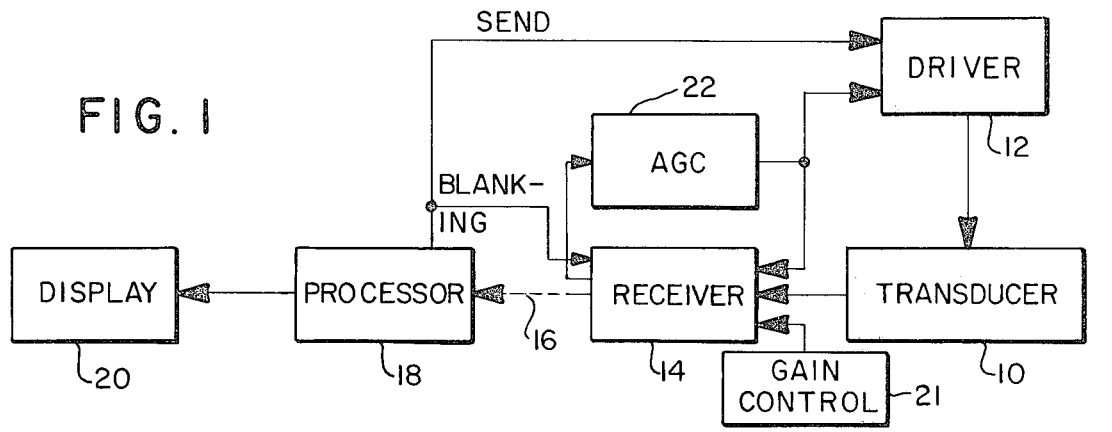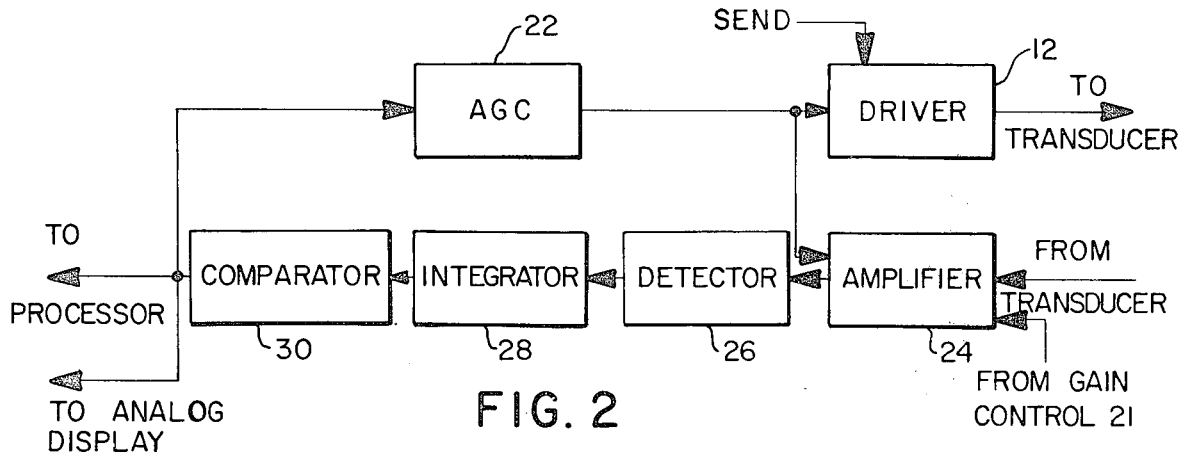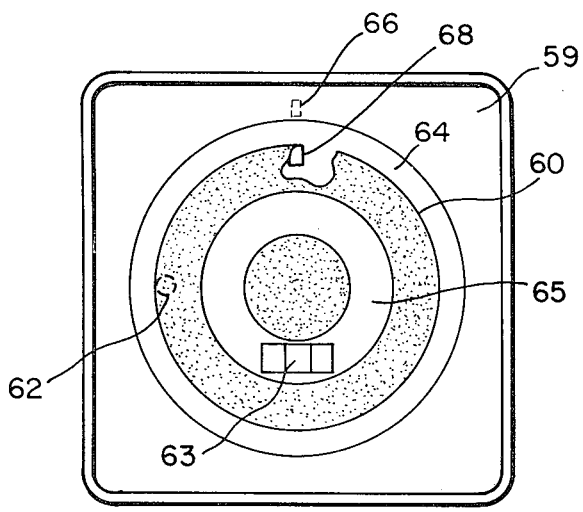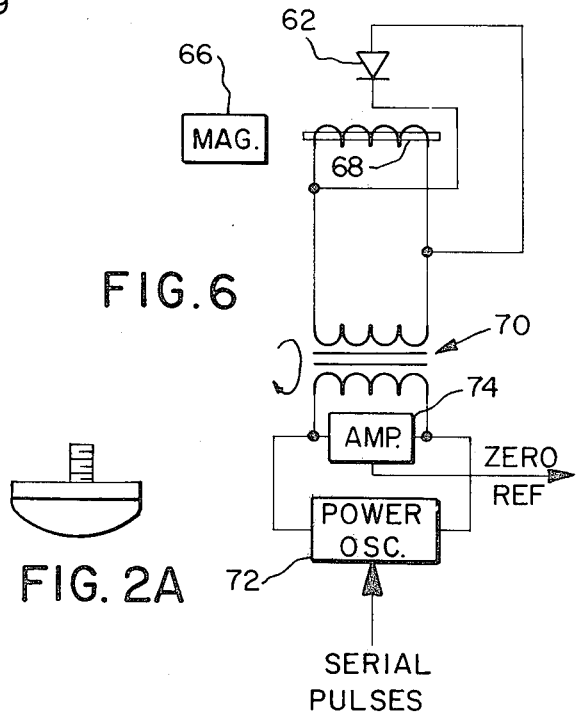

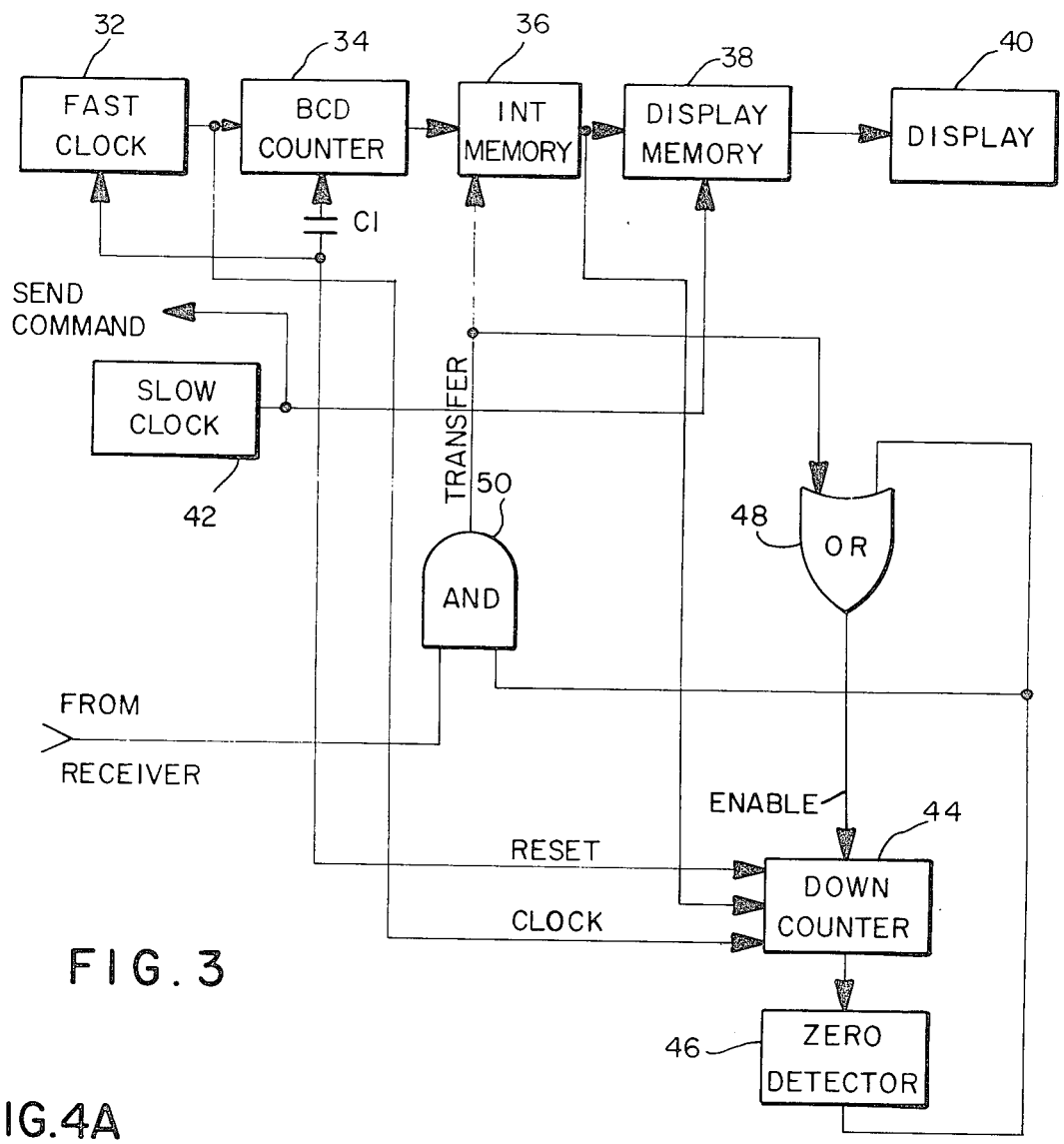

DIGITAL DEPTH SOUNDER

FIELD OF THE INVENTION

This invention relates to depth sounders and, more particularly, to depth sounders employing digital electronic circuitry for providing an output indication of water depth and for discriminating bottom echoes from spurious echoes.

BACKGROUND OF THE INVENTION

In depth sounders for measuring the depth of the ocean or other bodies of water, a sonic transducer is coupled to signal receiving and processing circuitry and transmits a pulse through the water and receives echo pulses from the bottom, the transit time between a transmitted and echo pulse being representative of depth. Echo pulses are also returned from objects which may be in the transmission path such as a school of fish or submerged flotsam and which echoes can give a spurious indication of water depth. A major requirement of commercially useful and dependable depth sounders have been the capability of discrimination between true bottom echoes and spurious echoes from other objects. It is also desirable to provide discrimination between true bottom echoes and harmonics thereof which may falsely indicate a greater depth than actually present.

Digital depth sounders have been proposed heretofore for providing a numerical indication of depth and for processing echo signals by digital circuit techniques. In general, discrimination between a bottom echo and spurious echoes has been attempted by comparing the signal strength of returning echo signals and basing such comparison upon certain assumptions. It is often assumed that a true bottom echo will be greater in intensity than echoes returned from other objects. However, in practice spurious echoes received from relatively small depths can be of the same or greater intensity than a bottom echo such that proper discrimination will not be achieved. It is also often assumed that depth varies by relatively small amounts from one sounding period to the next such that indicated depths do not markedly differ between successive sounding periods. However, this assumption is also often not valid as in many instances the bottom profile exhibits abrupt changes in height.

SUMMARY OF THE INVENTION

In accordance with the present invention, a digital depth sounder is provided in which only the last received echo during a sounding interval is displayed for depth indication and without necessity for comparing the intensity of different received echoes and without any assumption concerning the nature of the echo signals. The circuitry is typically implemented by well known microcircuit techniques and the receiver circuitry can be contained within the housing also containing the sonic transducer. The depth sounder provides a serial pulse output for driving an output display and this display can include both analog and digital output indications of depth.

Briefly, the novel depth sounder includes a receiver disposed within the same housing containing the sonic transducer and which provides serial output pulses, pulse width modulated in accordance with depth. The serial pulses are digitally processed to discriminate bottom echoes from spurious echoes. The digital circuitry includes a counter for providing a count sequence during a predetermined timing cycle and storage means for storing the count existing at the time of receipt of a first echo pulse, the stored count being updated upon receipt of each echo pulse. At the end of a timing cycle, the then count in the storage means is conveyed to output circuitry for display, the displayed depth indication being always of the last received echo. Circuitry is also provided to discriminate against spurious pulses harmonically related to other echo pulses.

DESCRIPTION OF THE DRAWING

The invention will be more fully understood from the following detailed description taken in conjunction with the accompanying drawing, in which:

FIG. 1 is a block diagram representation of a depth sounder embodying the invention;

FIG. 2 is a block diagram representation of the receiver of FIG. 1;

FIG. 2A is an elevational view of a typical housing for the invention;

FIG. 3 is a block diagram representation of the processor of FIG. 1 and constructed and operated according to the invention;

FIGS. 4A–4D are timing diagrams useful in illustrating operation of the invention;

FIG. 5 is a diagrammatic representation of a combined analog and digital display of the invention, and FIG. 6 is a schematic representation of the display of FIG. 5.

DETAILED DESCRIPTION OF THE INVENTION

A depth sounder embodying the invention is shown in block diagram form in FIG. 1 and includes a sonic transducer 10 energized by a signal from a driver 12 and which provides sonic pulses for propagation through a body of water. Echo pulses returned from the bottom surface, as well as from other surfaces or objects in the transmission path, are received by transducer 10 and a corresponding electrical output signal is provided to a receiver 14. The receiver provides pulse width modulated pulses via a transmission path 16 to a processor 18 which is operative to discriminate bottom echoes from spurious echoes to provide an output signal to a display 20 which visually indicates depth. An AGC circuit 22 receives an output signal from receiver 14 and provides a gain control signal to receiver 14 and to driver 12, the gain being adjusted to provide requisite echo returns for subsequent processing, as is known in the art. A signal is provided by processor 18 to driver 12 as a send command to initiate a sonic pulse transmission during each sounding period. This signal is also applied to receiver 14 as a blanking signal to blank receipt of the transmittal pulse.

A gain control circuit 21 can be coupled to receiver 14 to provide further control in addition to that of AGC circuit 22. Gain control 21 applies a control signal to receiver 14 to cause variation in the gain thereof during a sounding interval. The gain is increased, typically in a monotonic manner, from a zero or minimum level at the commencement of a sounding interval to a maximum level at the end of this interval, and the gain is likewise varied for each sounding interval. Specific gain characteristics are selected in a particular system to achieve substantially uniform amplitude echo signals at the receiver output irrespective of depth. Thus, in shallow depths, the echo signals will occur near the beginning of a sounding interval and will be of relatively high amplitude when the gain is relatively low. At greater depths, the echo signals will be of lesser amplitude and occurring the sounding interval when there is greater gain. As a result, the variable receiver gain tends to equalize the amplitudes of received echo signals to provide more uniform signals for subsequent processing. The AGC circuit 22 has a time constant longer than that of circuit 21 and operates in a well known manner to compensate for return signal variations such as caused by circuit variations and the nature of the bottom from which echoes are returned.

The receiver is shown more particularly in FIG. 2 and includes an amplifier 24 receiving signals from transducer 10 and from gain control 21 and providing an amplified version of the received signals to a detector 26 which provides an output signal representation of the envelope of the input signal applied thereto. This envelope signal is integrated by an integrator 28, the integrated signal being applied to a comparator 30 which includes an internal reference threshold. Comparator 30 provides an output signal of predetermined magnitude when the integrated signal applied thereto exceeds the internal threshold level, such that output pulses are provided by the comparator of a width corresponding to the duration of time that the integrated signal exceeds the reference threshold. The output pulses are, therefore, pulse width modulated in accordance with the magnitude and duration of the received echo pulses, and these pulses width modulated pulses are conveyed over transmission path 16 to processor 18 for signal processing and subsequent display of depth. The output pulses are also processed by an AGC circuit 22 to provide gain control of amplifier 24 and transducer driver 12.

In preferred implementation, transducer 10, driver 12, receiver 14, gain control 21 and AGC circuit 22 are contained within a unitary housing (FIG. 2A) typically attached to a hull bottom of a vessel in which the depth sounder is employed. The circuitry is implemented preferably in microcircuit form such that it occupies very little space and can readily be housed within the housing employed conventionally for mounting the transducer along to the vessel hull. All analog signal processing is accomplished within the unitary housing and the pulse wideth modulated pulses propagated or conveyed over transmission path 16 are essentially digital in character. Signal processing is also accomplished in a digital manner such that a coaxial or other low noise transmission line is not needed to interconnect the receiver 14 and processor 18. The susceptibility of the novel depth sounder to noise or other interference is also greatly reduced by the packaging of the analog circuitry in a unitary housing which eliminates the need for relatively long lead lengths as found in conventional systems. The provision of a pulse width modulated serial pulse train as an output for processing and display permits the use of a plurality of remote processors and associated displays to provide multiple readout of indicated depth. In addition, the analog circuitry within the common housing can be calibrated for the particular transducer employed such that each assembly is of standard electrical output to be interchangeable with various remote processors.

The digital processor for providing discrimination between bottom echoes and spurious echoes is shown in FIG. 3 and includes a fast clock 32, which provides master timing pulses, coupled to a BCD counter 34, the output of which is coupled to an intermediate memory 36 such as a semiconductor memory. The output of the intermediate memory 36 is coupled to a display memory 38, also typically a semiconductor memory, and the output of which, in turn, is coupled to a digital display 40, such as a multidigit numerical indicator.

A slow clock 42 is coupled via a capacitor CI to the reset terminal of counter 34 and is also applied to fast clock 32 and display memory 38. The slow clock also provides a send command which is directed to the transmitter to cause triggering of a pulse transmission by the sonic transducer (FIG. 1). Slow clock 42 also provides a reset signal to down counter 44 which also receives the output code from intermediate memory 36 and clock signals from fast clock 32. The output of down counter 44 is coupled to a zero detector 46, the output of which is applied to one input of an AND gate 50, the other input of which is the serial pulses received from transducer 10 (FIG. 1) representing echo data. The output of gate 50 is applied to intermediate memory 36 as a transfer signal therefor and is also applied via an OR gate 48 to down counter 44 as an enable signal. The output of zero detector 46 is also applied as an input to OR gate 48. In operation, slow clock 42 provides a timing gate, shown in FIG. 4B, the leading edge of which provides after processing by capacitor CI a reset pulse (FIG. 4C) to counter 34 at the start of each timing signal. The leading edge of the slow clock gate also serves as a send command as discussed above to cause commencement of transmission by the sonic transducer. The fast clock pulses, shown in FIG. 4D, are applied to counter 34 which increments to counts representative of the number of received fast clock pulses. The received pulses provided by echoes from the ocean bottom as well as from intermediate objects in the transmission path and from harmonic echoes are in the form of pulse width modulated pulses shown in FIG. 4A. The received serial echo pulses are applied to AND gate 50 which provides a transfer pulse the leading edge of which is operative to cause storage in memory 36 of the then count present in counter 34. The count then stored in intermediate memory 36 is applied to down counter 44 which is enabled by the trailing edge of the transfer signal provided by gate 50. Down counter 44 decrements under the government of pulses from fast clock 32 toward its zero state. Upon receipt of the next echo pulse, and so long as counter 44 has not reached its zero state, the latest count provided by counter 34 is transferred to intermediate memory 36 by a transfer pulse from gate 50. Such updating of the count stored by memory 36 continues for each echo pulse received during a timing cycle unless counter 44 has reached its zero state.

Upon the occurrence of a gate signal from slow clock 42 to commence another timing cycle on leading edge of slow clock, the data then in the intermediate memory 36 is conveyed to display memory 38 and thence to display 40 for visual indication of the depth represented by the count provided by the last received echo pulse. Thus, the displayed depth is always in response to the last received echo pulse, the spurious pulses not having been processed for erroneous display.

According to the invention, echo pulses are also discriminated against which are harmonically related to any of the received echoes, such as would occur from an echo received after double reflection from the ocean bottom and which would give a seriously erroneous indication of depth. Harmonic discrimination is provided by operation of down counter 44, zero detector 46 and the associated gating circuitry in the following manner. When down counter 44 reaches it zero or other reference state, as detected by zero detector 46, AND gate 50 is disabled to inhibit the transfer of data from intermediate memory 36. The down counter commences its counting cycle each time a number is stored in intermediate memory 36. Upon commencement of each timing cycle, down counter 44 is reset to an initial count from which the counter begins decrementing to a zero state. Each count stored in intermediate memory 36 is transferred to the down counter which begins its decrementing operation from the then entered count from the intermediate memory. When counter 44 reaches its zero condition, and gate 50 is disabled to prevent a received echo pulse occuring within the defined zero time interval from causing transfer of the data stored in memory 36, the output from zero detector 46 is applied via OR gate 48 to the enable terminal of counter 44 to re-enter the data stored in memory 36 to again cause cycling of counter 44 toward its zero state.

The zero or reference state of counter 44 is in practice usually selected to be a range of counts representative of a near zero condition and defines a time interval within which received echo pulses which are likely to be harmonics of a true echo pulse are not loaded into the intermediate memory for further processing. In essence, down counter 44 and zero detector 46 define a time window within which the occurrence of a pulse will be inhibited as being a harmonious echo. As a result, the information displayed is representative of the last echo received which is not harmonically related to any of the echo pulses.

The received echo pulses can also be applied to a rotary display to provide an analog representation of depth alone or in conjunction with a numerical output indication of bottom depth. A preferred display useful to provide both analog and digital depth indication is shown in outward configuration in FIG. 5 and schematically in FIG. 6. Referring to FIG. 5, a housing 59 contains a rotatable disc 60 driven by a suitable motor (not shown) and having an illumination source such as a light emitting diode (LED) 62 at the periphery of the disc and rotatable therewith. An annular ring 64 surrounds disc 60 and contains output markings of depth. Multidigit numerical indicator 63 is disposed behind a transparent portion 65 of disc 60 to display numerical depth indications. A magnet 66 is provided at a zero reference location with respect to ring 64, and a magnetic sensor 68 is disposed at the periphery of disc 60 and rotatable with the disc. Electrical coupling is providing by a rotary transformer, and as shown in FIG. 6, a rotary transformer 70 has its input winding connected to a power oscillator 72 the input of which receives serial pulses from the receiver. An amplifier 74 is also coupled to the input winding of rotary transformer 70, the output of which is a zero reference signal synchronized to the slow clock. For example, the zero reference signal can be employed to gate the slow clock to maintain system synchronization. The output winding of rotary transformer 70 is coupled to LED 62 and to magnetic sensor 68.

During operation, serial pulses applied to oscillator 72 cause corresponding modulated pulse bursts which are coupled via rotary transformer 70 to LED 62 to cause the illumination thereof. The LED is illuminated during its rotation with disc 60 and illumination occurs at an angular position corresponding to a bottom depth to be indicated. Upon passage by sensor 68 of magnet 66 during rotation of disc 60, a reference pulse is produced by the sensor which is coupled via the rotary transformer to amplifier 74 which produces a zero reference signal representing a reference position of disc 60 and which is employed to synchronize the associated processor circuitry. It will be appreciated that the display requires no slip rings or other mechanical couplings for conveying electrical information, as energizing power for the LED and reference data from the magnetic sensor are both coupled between the display and external circuitry by the rotary transformer which serves as a common coupling means.

It will be appreciated that the invention can be variously implemented to suit specific operating requirements without departing from the true scope of the invention. Accordingly, it is not intended to limit the invention by what has been particularly shown and described except as indicated in the appended claims.

What is claimed is:

1. A depth sounder comprising:
   counter means for providing successive counts during a predetermined timing cycle;
   means for receiving echo pulses;
   intermediate storage means coupled to said counter means;
   display storage means coupled to said intermediate storage means;
   first transfer means operative in response to each received echo pulse during a single sounding interval to cause storage of the then count of said counter means in said intermediate storage means;
   second transfer means operative in response to a signal representative of the end of a timing cycle to cause transfer of the then count in said intermediate storage means to said display storage means; and
   display means operative to provide an output indication of the count stored in said display storage means and representative of bottom depth.

2. The depth sounder according to claim 1 further including:
   second counter means operative upon storage of a count in said intermediate storage means to commence a counting cycle toward a reference state;
   means for detecting the reference state of said second counter means and to provide an output signal in response thereto; and
   gating means operative in response to said output signal to inhibit transfer of information from said intermediate storage means to said display storage means.

3. The depth sounder according to claim 1 wherein said receiving means includes:
   a first gain control circuit operative to compensate for return signal variations; and
   a second gain control circuit operative to cause variation in the gain of said receiving means from a minimum level at the commencement of a timing cycle to a maximum level at the end of said timing cycle and of a gain characteristic providing substantially uniform amplitude echo signals at the output of said receiving means.

4. The depth sounder according to claim 1 wherein said display means includes a multidigit numerical indicator providing a numerical output indication of bottom depth.

5. The invention according to claim 1 wherein said display means includes:
 a multidigit numerical indicator providing a numerical output indication of bottom depth; and
 a rotary analog display providing an output indication of bottom depth by the illumination of a visual indicator at an angular position representative of measured depth.

6. The depth sounder according to claim 5 wherein said rotary analog display includes:
 a rotary transformer having input and output windings;
 oscillator means coupled to said input winding and operative in response to received serial pulses to provide corresponding pulse bursts to said first input winding;
 an illumination source coupled to said output winding and energized by said pulse bursts;
 sensor means coupled to said output winding and operative to provide a signal indication at a reference position of said disc;
 amplifier means coupled to said input winding and operative to provide a reference signal in response to sensing of said reference position by said sensor means; and
 a rotatable disc having said illumination source and said sensor means at predetermined positions near the periphery thereof and rotatable with said disc.

7. The depth sounder according to claim 1 wherein said first transfer means includes a gate operative in response to each received echo pulse for providing a transfer signal to said intermediate storage means;
 and wherein said second transfer means includes timing means providing a gate signal defining said timing cycle.

8. A depth sounder comprising:
 a housing adapted for attachment to a vessel beneath the surface of a body of water;
 a sonic transducer in said housing for providing sonic pulses for transmission through said body of water and for receiving sonic echo pulses;
 driver means in said housing for energizing said transducer;
 receiver means in said housing for receiving input pulses from said transducer provided in response to received sonic echo pulses and operative to produce serial output pulses representative of bottom and spurious echoes;
 means for initiating transmission of a sonic pulse by said transducer during each sounding interval;
 digital processing means remote from said housing and interconnected with said receiver by a single serial data channel and operative in response to said serial pulses to discriminate bottom echoes from spurious echoes; and
 display means for indicating the depths represented by said bottom echoes.

9. The depth sounder according to claim 8 wherein said serial output pulses from said receiver means are pulse width modulated.

10. The depth sounder according to claim 9 wherein said receiving means includes;
 a first gain control circuit operative to compensate for return signal variations; and
 a second gain control circuit operative to cause variation in the gain of said receiving means from a minimum level at the commencement of a timing cycle to a maximum level at the end of said timing cycle and of a gain characteristic providing substantially uniform amplitude echo signals at the output of said receiving means.

* * * * *